United States Patent
Yang

(10) Patent No.: US 10,070,408 B2
(45) Date of Patent: Sep. 4, 2018

(54) APPLICATION REGISTRATION METHODS AND APPARATUSES

(71) Applicant: ZTE CORPORATION, Shenzhen, Guangdong Province (CN)

(72) Inventor: Kun Yang, Shenzhen (CN)

(73) Assignee: ZTE CORPORATION, Shenzhen, Guangdong Province (CN)

( * ) Notice: Subject to any disclaimer, the term of this patent is extended or adjusted under 35 U.S.C. 154(b) by 0 days.

(21) Appl. No.: 15/502,901

(22) PCT Filed: Feb. 11, 2015

(86) PCT No.: PCT/CN2015/072805
§ 371 (c)(1),
(2) Date: Feb. 9, 2017

(87) PCT Pub. No.: WO2016/026282
PCT Pub. Date: Feb. 25, 2016

(65) Prior Publication Data
US 2017/0238273 A1    Aug. 17, 2017

(30) Foreign Application Priority Data
Aug. 20, 2014    (CN) .......................... 2014 1 0415695

(51) Int. Cl.
H04W 4/00    (2018.01)
H04W 60/00    (2009.01)
(Continued)

(52) U.S. Cl.
CPC ........... *H04W 60/00* (2013.01); *H04W 4/005* (2013.01); *H04W 4/70* (2018.02); *H04W 8/24* (2013.01)

(58) Field of Classification Search
CPC ..... H04W 60/00; H04W 8/245; H04W 4/005; H04W 60/04; H04W 8/26; H04W 88/02;
(Continued)

(56) References Cited

U.S. PATENT DOCUMENTS

2013/0212236 A1*  8/2013  Foti ........................ G06F 15/177
                                                       709/221
2013/0310027 A1*  11/2013  Foti .......................... H04W 8/02
                                                        455/432.1
(Continued)

FOREIGN PATENT DOCUMENTS

CN    102045690    5/2011
CN    103491527    1/2014

OTHER PUBLICATIONS

International Search Report, International application No. PCT/CN2015072805, dated May 22, 2015.
(Continued)

*Primary Examiner* — Danh Le
(74) *Attorney, Agent, or Firm* — Koppel, Patrick, Heybl & Philpott

(57) ABSTRACT

Provided are application registration methods and apparatuses. In a registration method, a Common Services Entity in an Infrastructure Node (IN-CSE) receives a first registration request from an Application Entity (AE) of a Machine-to-Machine/Man Service Provider (M2M SP), wherein the first registration request carries a binding relationship between an identifier of a CSE in a User Equipment (UE) and an M2M External Identifier (M2M-Ext-ID) of the UE; the IN-CSE sends a second registration request to an underlying Network Services Entity (NSE); and the IN-CSE receives a first registration response from the NSE, wherein the first registration response is a response message corresponding to the second registration request.

20 Claims, 2 Drawing Sheets

(51) Int. Cl.
*H04W 8/24* (2009.01)
*H04W 4/70* (2018.01)

(58) Field of Classification Search
CPC ......... H04M 1/72519; H04M 1/72522; H04M 1/72525; H04L 61/106
USPC .......................... 455/435.1, 550.1, 418, 328
See application file for complete search history.

(56) References Cited

U.S. PATENT DOCUMENTS

| | | | |
|---|---|---|---|
| 2013/0315155 A1 | 11/2013 | Foti et al. | |
| 2013/0318218 A1* | 11/2013 | Foti | H04W 72/0406 709/222 |
| 2014/0086143 A1* | 3/2014 | Foti | H04W 4/005 370/328 |
| 2014/0086144 A1* | 3/2014 | Foti | H04L 61/106 370/328 |
| 2014/0282993 A1* | 9/2014 | Van Till | H04L 63/08 726/9 |
| 2015/0043430 A1* | 2/2015 | Garcia Martin | H04L 61/157 370/328 |
| 2015/0045074 A1* | 2/2015 | Wong | H04W 4/14 455/466 |
| 2015/0117445 A1* | 4/2015 | Koponen | H04L 41/0896 370/389 |

OTHER PUBLICATIONS

European Search Report, Application No. 15833025.8, dated Jul. 24, 2017.

* cited by examiner

APPLICATION REGISTRATION METHODS AND APPARATUSES

TECHNICAL FIELD

The present disclosure relates to the field of communications, and more particularly to application registration methods and apparatuses.

BACKGROUND

Machine-to-Machine/Man (M2M) communication system consists of M2M nodes and an underlying network. M2M nodes communicate with each other through the underlying network. One M2M node contains at least one Application Entity (AE) or one Common Services Entity (CSE). The AE is a logical unit executing actual M2M applications. The CSE is a logical unit managing and serving the M2M applications. An underlying Network Services Entity (NSE) provides for CSEs services such as device management, location services and device triggering. The NSE may be embodied as Home Subscriber Server (HSS), Machine Type Communication-Inter-Working Function (MTC-IWF) entity, and the like.

The communication between the M2M applications is implemented by the interaction between CSEs. The M2M applications need to be registered to the CSE. The CSEs also need to register with each other so as to implement the interaction of the M2M applications through the communication between the CSEs. FIG. 1 shows the architecture of a M2M system.

In the architecture of the M2M system, as shown in FIG. 1, the application node is an execution node at the terminal side, and may be, e.g., a smart meter, a temperature measurement and control sensor, a fire alarm, a smart appliance, etc. The Middle Node (MN) is a middleware connecting the execution node at the terminal side to the server at the network side, and may be a gateway. The Infrastructure Node (IN) is a server at the network side. An application entity registered to the IN (abbreviated as IN-AE) may be a management platform of an M2M Service Provider (abbreviated as M2M SP). The M2M SP maintains a binding relationship between the identifier of the M2M node and the CSE and the identifier in the underlying network.

The application nodes can be divided into two categories according to their functions: nodes that contain CSE and nodes that do not contain CSE. An Application Dedicated Node (ADN) includes at least one AE without CSE. An Application Service Node (ASN) includes at least one AE and one CSE. Physically, the ASN or MN corresponds to a User Equipment (UE).

In practical applications, when an IN-AE needs to create, retrieve, update or delete a resource in the UE, the IN-AE should trigger the ASN or the CSE in the MN (abbreviated as ASN/MN-CSE) to establish a connection with a Common Services Entity in the Infrastructure Node (abbreviated as IN-CSE). As a server at the network side, the trigger message needs to be transmitted through the underlying network. The server provides the following information to the underlying network so as to perform device triggering.

1) M2M External Identifier (abbreviated as M2M-Ext-ID): an identifier for identifying a target UE of a trigger request.

2) Recipient Identifier of the Trigger message (abbreviated as Trigger-Recipient-ID): an identifier used for routing a trigger message to a target ASN/MN-CSE in the UE.

3) IN-CSE Identifier (abbreviated as IN-CSE ID).

The M2M-Ext-ID is one of the information necessary to perform the device triggering and should be provided to the underlying network by the server. However, in the related art, there is no effective mechanism for the IN-CSE to acquire the M2M-Ext-ID, which inevitably results in the incapability of implementing the device triggering process.

No effective solutions have been proposed at present to solve the abovementioned problem in the related art.

SUMMARY

For the technical problem in the related art that the processes such as device triggering cannot be triggered due to the lack of an effective mechanism for acquiring an M2M-Ext-ID, embodiments of the present disclosure provide application registration methods and apparatuses to solve at least the above technical problem.

According to an embodiment of the present disclosure, there is provided an application registration method, including that: the IN-CSE receives a first registration request from the AE of the M2M SP, the first registration request carrying a binding relationship between an identifier of a CSE in a UE and an M2M-Ext-ID of the UE; the IN-CSE sends a second registration request to a NSE; and the IN-CSE receives a first registration response from the NSE, the first registration response being a response message corresponding to the second registration request.

In an exemplary embodiment, the second registration request carries a binding relationship between an identifier of the M2M SP and the M2M-Ext-ID of the UE.

In an exemplary embodiment, the NSE includes a user subscription data storage network element and a MTC-IWF entity; the step that the IN-CSE sends the second registration request to the NSE includes that: the IN-CSE sends the second registration request to the user subscription data storage network element via the MTC-IWF entity; and the step that the IN-CSE receives the registration response from the NSE includes that: the IN-CSE receives the first registration response sent by the user subscription data storage network element via the MTC-IWF entity.

In an exemplary embodiment, in a process that the IN-CSE sends the second registration request via the MTC-IWF entity to the user subscription data storage network element, the method further includes that: the MTC-IWF entity buffers an association relationship between the IN-CSE and the AE.

In an exemplary embodiment, in a process that the IN-CSE receives the first registration response sent by the user subscription data storage network element via the MTC-IWF entity, the method further includes that: the user subscription data storage network element locally stores a binding relationship between an identifier of an M2M SP subscribed by the UE and the M2M-Ext-ID of the UE.

In an exemplary embodiment, the CSE in the UE includes at least one of a CSE in an ASN and a CSE in an MN.

In an exemplary embodiment, after the IN-CSE receives the first registration response from the NSE, the method further includes that: the IN-CSE sends a second registration response to the AE, the second registration being used for notifying the AE that registration has been completed.

In an exemplary embodiment, after the IN-CSE receives the first registration response from the NSE, the method further includes that: the IN-CSE locally stores the binding relationship between the identifier of the CSE in the UE and the M2M-Ext-ID of the UE.

In an exemplary embodiment, before the IN-CSE receives the first registration request from the AE, the method further includes that: the M2M SP pre-allocates the M2M-Ext-ID for the subscribed UE, determines the binding relationship between the identifier of the CSE in the UE and the M2M-Ext-ID of the UE, and stores, in the AE of the M2M SP, the binding relationship between the identifier of the CSE in the UE and the M2M-Ext-ID of the UE.

According to an embodiment of the present disclosure, there is provided an application registration method, including that: a NSE receives a second registration request from the IN-CSE, the second registration request being a registration request sent after the IN-CSE receives a first registration request sent by the AE of the M2M SP, and the first registration request carrying a binding relationship between an identifier of a CSE in the UE and an M2M-Ext-ID of the UE; and the NSE sends a first registration response to the IN-CSE, the first registration response being a response message corresponding to the second registration request.

In an exemplary embodiment, the second registration request carries a binding relationship between an identifier of the M2M SP and the M2M-Ext-ID of the UE.

In an exemplary embodiment, after the NSE sends the first registration response to the IN-CSE, the method further includes that: the IN-CSE sends a second registration response to the AE, the second registration being used for notifying the AE that registration has been completed.

In an exemplary embodiment, the NSE includes a user subscription data storage network element and a MTC-IWF entity; the step that the NSE receives the second registration request from the IN-CSE includes that: the user subscription data storage network element receives the second registration request via the MTC-IWF entity; and the step that the NSE sends the first registration response to the IN-CSE includes that: the user subscription data storage network element sends the first registration response to the IN-CSE via the MTC-IWF entity.

In an exemplary embodiment, in a process that the user subscription data storage network element receives the second registration request via the MTC-IWF entity, the method further includes that: the MTC-IWF entity buffers an association relationship between the IN-CSE and the AE.

In an exemplary embodiment, in a process that the user subscription data storage network element sends the first registration response to the IN-CSE via the MTC-IWF entity, the method further includes that: the user subscription data storage network element locally stores a binding relationship between an identifier of an M2M SP subscribed by the UE and the M2M-Ext-ID of the UE.

According to another embodiment of the present disclosure, there is further provided an application registration apparatus, applied to an IN-CSE. The application registration apparatus includes: a first receiving module arranged to receive a first registration request from an AE of a M2M SP, the first registration request carrying a binding relationship between an identifier of a CSE in a UE and an M2M-Ext-ID of the UE; a first sending module arranged to send a second registration request to a NSE; and a second receiving module arranged to receive a first registration response from the NSE, the first registration response being a response message corresponding to the second registration request.

According to another embodiment of the present disclosure, there is further provided an application registration apparatus, applied to a NSE. The application registration apparatus includes: a receiving module arranged to receive a second registration request from a IN-CSE, the second registration request being a registration request sent after the IN-CSE receives a first registration request sent by an AE of a M2M SP, and the first registration request carrying a binding relationship between an identifier of a CSE in a UE and an M2M-Ext-ID of the UE; and a sending module arranged to send a first registration response to the IN-CSE, the first registration response being a response message corresponding to the second registration request.

According to the embodiments of the present disclosure, an IN-CSE sends a second registration request according to a first registration request received from an AE of an M2M SP, the first registration request carrying a binding relationship between an identifier of a CSE in a UE and an M2M-Ext-ID of the UE, and the second registration request carrying a binding relationship between an identifier of an M2M SP and an M2M-Ext-ID of the UE. The registration of an M2M application is implemented, and the technical problem in the related art that the processes such as device triggering cannot be triggered due to the lack of an effective mechanism for acquiring an M2M-Ext-ID is solved.

BRIEF DESCRIPTION OF THE DRAWINGS

The drawings described herein are intended to provide a further understanding of the present disclosure and form a part of the application. The illustrative embodiments of the present disclosure and the description thereof are illustrative of the present disclosure and are not to be construed as limiting the present disclosure. In the drawings.

DETAILED DESCRIPTION OF THE EMBODIMENTS

Hereinafter, the present disclosure will be described in detail with reference to the accompanying drawings and in combination with embodiments. It should be noted that, in the case of no conflict, the embodiments of the present application and the features of the embodiments may be combined with each other.

Figure 1:
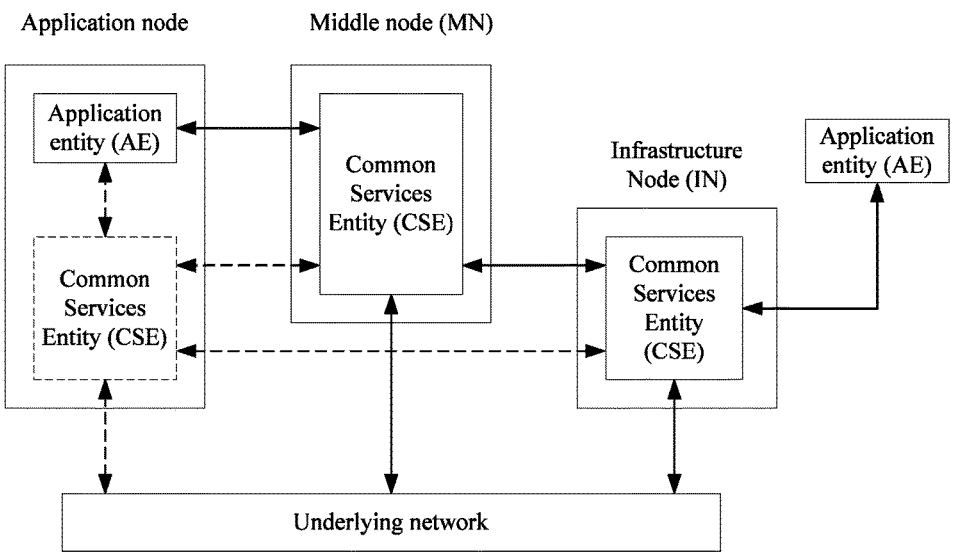
FIG. 1 is a schematic diagram showing the architecture of a M2M system in the related art.
Figure 2:
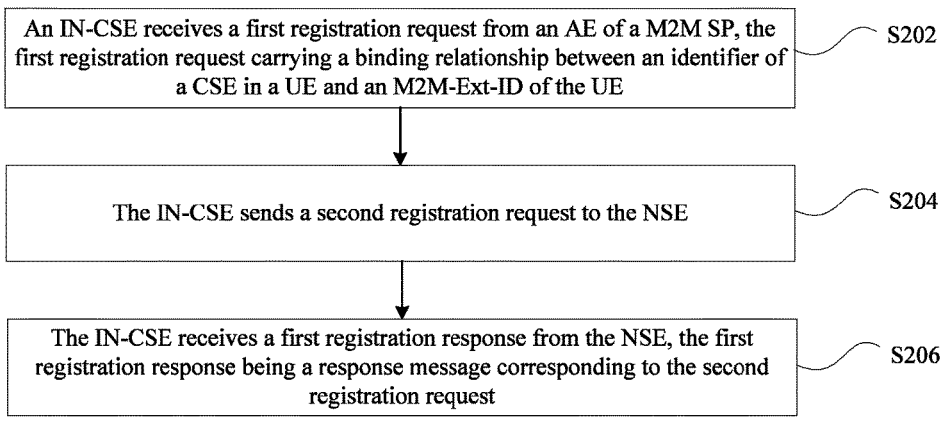
FIG. 2 is a flowchart of an application registration method according to an embodiment of the present disclosure.

FIG. 2 is a flowchart of an application registration method according to an embodiment of the present disclosure. As shown in FIG. 2, the method includes the following steps.

Step S202: An IN-CSE receives a first registration request from an AE of a M2M SP, the first registration request carrying a binding relationship between an identifier of a CSE in a UE and an M2M-Ext-ID of the UE.

Step S204: The IN-CSE sends a second registration request to the NSE.

Step S206: The IN-CSE receives a first registration response from the NSE, the first registration response being a response message corresponding to the second registration request.

Through the abovementioned processing steps, the registration process of M2M application is implemented. In this way, necessary information for processes such as device triggering can be provided by virtue of the registration process. For example, in order to achieve this effect, the first registration request may carry a binding relationship between an identifier of a CSE in a UE and an M2M-Ext-ID of the UE. In this way, the IN-CSE can be notified of the binding relationship so as to provide support to the subsequent service processes (such as the device triggering process).

In an exemplary embodiment, the second registration request carries a binding relationship between an identifier of the M2M SP and the M2M-Ext-ID of the UE.

Since the UE corresponds to the ASN or the MN, the CSE in the abovementioned UE may include a CSE in the ASN and/or a CSE in the MN.

The NSE may include a user subscription data storage network element and a MTC-IWF entity. Step S204 may be implemented in the following manner: the IN-CSE sends the second registration request to the user subscription data storage network element via the MTC-IWF entity. Correspondingly, Step S206 may be implemented in the following manner: the IN-CSE receives the first registration response sent by the user subscription data storage network element via the MTC-IWF entity.

In the process that the IN-CSE sends the second registration request via the MTC-IWF entity to the user subscription data storage network element, the MTC-IWF entity may buffer an association relationship between the IN-CSE and the AE.

In the process that the IN-CSE receives the first registration response sent by the user subscription data storage network element via the MTC-IWF entity, the user subscription data storage network element may locally store a binding relationship between an identifier of an M2M SP subscribed by the UE and the M2M-Ext-ID of the UE.

In order to improve the abovementioned registration process, after the IN-CSE receives the first registration response from the NSE, the IN-CSE may locally store the binding relationship. In other words, only when the AE is registered in the underlying network successfully, the IN-CSE stores the information of the AE; when the AE is not successfully registered in the underlying network, the information is deleted.

In the present embodiment, the abovementioned binding relationship may be determined by, but not limited to, the following ways: the abovementioned M2M SP pre-allocates the M2M-Ext-ID for the subscribed UE, determines the binding relationship, and stores the binding relationship in the AE.

The M2M-Ext-ID is one of the information necessary to perform the device triggering and should be provided to the underlying network by the server. However, in the related art, there is no effective mechanism for the IN-CSE to acquire the M2M-Ext-ID, which inevitably results in the incapability of implementing the device triggering process. In the present embodiment, since the first registration request carries the binding relationship, the technical problem existing in the related art can be solved.

In addition, when the UE initiates the connection establishment with the server, it is needed to retrieve the M2M-Ext-ID corresponding to the subscribed M2M SP. In the present embodiment, since the second registration request carries the binding relationship (that is, the binding relationship between the identifier of the M2M SP and the M2M-Ext-ID of the UE). It is possible to solve this technical problem existing in the related art.

In an exemplary implementation, the user subscription data storage network element may be HSS, but is not limited thereto.

Figure 3:
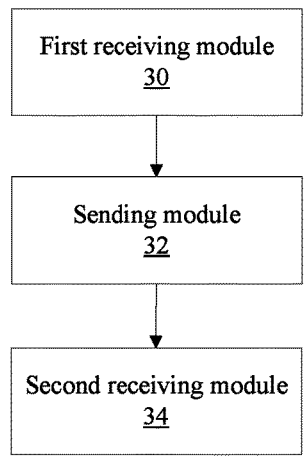
FIG. 3 is a structure block diagram of an application registration apparatus according to an embodiment of the present disclosure.

In another embodiment, there is further provided an application registration apparatus for implementing the abovementioned method, which is applied to an IN-CSE. As shown in FIG. 3, the apparatus includes:

a first receiving module 30 arranged to receive a first registration request from an AE of a M2M SP, the first registration request carrying a binding relationship between an identifier of a CSE in a UE and an M2M-Ext-ID of the UE;

a sending module 32 coupled to the first receiving module 30 and arranged to send a second registration request to a NSE; and a second receiving module 34 coupled to the sending module 32 and arranged to receive a first registration response from the NSE, the first registration response being a response message corresponding to the second registration request.

It should be noted that the abovementioned modules may be implemented by software or hardware, and the latter may be realized by, but not limited to, the following form: the abovementioned modules are located in the same processor, or the abovementioned modules are located in different processors, respectively.

Figure 4:
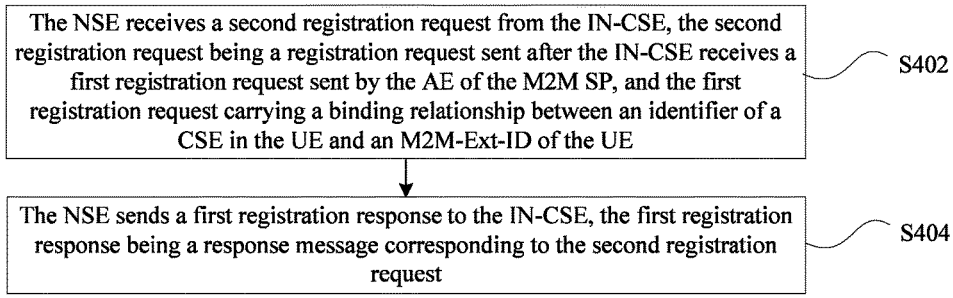
FIG. 4 is another flowchart of an application registration method according to an embodiment of the present disclosure.

In another embodiment, there is further provided another application registration method. As shown in FIG. 4, the method includes the following steps.

Step S402: A NSE receives a second registration request from an IN-CSE, the second registration request being a registration request sent after the IN-CSE receives a first registration request sent by an AE of a M2M SP, and the first registration request carrying a binding relationship between an identifier of a CSE in a UE and an M2M-Ext-ID of the UE.

Step S404: The NSE sends a first registration response to the IN-CSE, the first registration response being a response message corresponding to the second registration request.

In an exemplary implementation, the abovementioned second registration request may carry a binding relationship between an identifier of the M2M SP and the M2M-Ext-ID of the UE.

In an exemplary embodiment, the NSE may include a user subscription data storage network element and a MTC-IWF entity. Step S402 may be implemented in the following manner: the user subscription data storage network element receives the second registration request via the MTC-IWF entity. Step S404 may be implemented the following manner: the user subscription data storage network element sends the first registration response to the IN-CSE via the MTC-IWF entity.

In an exemplary embodiment, in the process that the user subscription data storage network element receives the second registration request via the MTC-IWF entity, the MTC-IWF entity may buffer an association relationship between the IN-CSE and the AE.

In the process that the user subscription data storage network element sends the first registration response to the IN-CSE via the MTC-IWF entity, the user subscription data storage network element may locally store a binding relationship between an identifier of an M2M SP subscribed by the UE and the M2M-Ext-ID of the UE.

In an exemplary embodiment, after Step S402, the IN-CSE may send a second registration response to the AE, the second registration being used for notifying the AE that registration has been completed.

Figure 5:
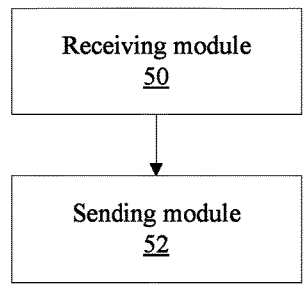
FIG. 5 is another structure block diagram of an application registration apparatus according to an embodiment of the present disclosure.

In another embodiment, there is further provided an application registration apparatus which is applied to an IN-CSE, for implementing the abovementioned method. As shown in FIG. 5, the apparatus includes:

a receiving module 50 arranged to receive a second registration request from a IN-CSE, the second registration request being a registration request sent after the IN-CSE registers the AE by receiving a first registration request sent by an AE of a M2M SP, and the first registration request carrying a binding relationship between an identifier of a CSE in a UE and an M2M-Ext-ID of the UE; and a sending module 52 coupled to the receiving module 50 and arranged to send a first registration response to the IN-CSE, the first registration response being a response message corresponding to the second registration request.

It should be noted that the abovementioned modules may be implemented by software or hardware, and the latter may be realized by, but not limited to, the following form: both the receiving module 50 and the sending module 52 are located in the same processor, or the receiving module 50 and the sending module 52 are located in a first processor and a second processor, respectively.

It should be noted that the "first" and "second" referred to in the present embodiment are used only for the purpose of distinguishing, and is not intended to limit the order.

For a better understanding of the abovementioned embodiments, the following description will be made in detail with reference to an exemplary embodiment.

A M2M application registration method provided by the present exemplary embodiment includes the following processing steps.

1. A M2M SP pre-allocates a M2M-Ext-ID for a subscribed UE, determines a binding relationship between an identifier of a CSE (abbreviated as CSE ID hereinafter) in the UE and the M2M-Ext-ID of the UE, and stores the binding relationship in an information storage of an AE of the M2M SP.

In specific implementation, a one-to-one mapping relationship list between the identifier of the CSE in the UE, that is, the identifier of the ASN/MN-CSE, and the M2M-Ext-ID of the UE, that is, the M2M-Ext-ID, may be established and stored in the information storage of the AE, as shown in Table 1.

TABLE 1

| CSE-ID | Device-ID |
|---|---|
| ASN-CSE#1 | M2M-Ext-ID#1 |
| MN-CSE#1 | M2M-Ext-ID#2 |
| ... | ... |
| ASN-CSE#N | M2M-Ext-ID#N |

2. The AE sends a registration request to a CSE in the server subscribed by the M2M SP, and the request message contains the binding relationship, and further contains:
 1) M2M-SP-ID: an identifier of the M2M SP; and
 2) AE-ID: an identifier of the AE;
3. The CSE receives a registration request sent by the AE and sends a registration request to the MTC-IWF, and the request message contains:
 1) M2M-SP-ID: an identifier of the M2M SP;
 2) AE-ID: an identifier of the AE;
 3) Device-ID: the pre-allocated M2M-Ext-ID set; and
 4) CSE-ID: an identifier of the CSE in the server.
4. The MTC-IWF receives the registration request sent by the CSE, buffers the association relationship between the CSE and the AE, and sends a subscription request to the HSS, and the request message contains:
 1) M2M-SP-ID: an identifier of the M2M SP;
 2) Device-ID: the pre-allocated M2M-Ext-ID set; and
 3) CSE-ID: an identifier of the CSE in the server.

In specific implementation, an association relationship list between the identifier of the CSE in the server, that is, the identifier of the IN-CSE, and the identifier of the AE of the CSE registered in the server, that is, the identifier of the IN-AE, may be established and stored in the information storage of the MTC-IWF, as shown in Table 2.

TABLE 2

| IN-AE ID | IN-CSE ID |
|---|---|
| IN-AE #1 | IN-CSE #1 |
| IN-AE #2 | IN-CSE #2 |
| IN-AE #3 | IN-CSE #2 |
| ... | ... |
| IN-AE #N | ASN-CSE #N |

5. The HSS receives the subscription request transmitted by MTC-IWF, stores the binding relationship between the pre-allocated M2M-Ext-ID of the UE and the identifier of the M2M SP subscribed by the UE in the local information storage after the authentication of the CSE in the server is passed, and sends a subscription response to the MTC-IWF. The response message contains the CSE-ID, that is, the identifier of the CSE in the server.

In specific implementation, a one-to-one mapping relationship list between the M2M-Ext-ID of the UE and the identifier of the M2M SP subscribed by the UE may be established and stored in the information storage of the HSS, as shown in Table 3.

TABLE 3

| M2M-SP-ID | Device-ID |
|---|---|
| M2M-SP #1 | M2M-Ext-ID#1 |
| M2M-SP #2 | M2M-Ext-ID#2 |
| ... | ... |
| M2M-SP #N | M2M-Ext-ID#N |

6. The MTC-IWF receives the subscription response sent by the HSS and sends a registration response to the CSE in the server according to the identifier of the CSE in the server. The response message contains the AE-ID, that is, the identifier of the AE.

7. The CSE in the server receives the registration response sent by the MTC-IWF, stores the binding relationship between the identifier of the CSE in the UE and the M2M-Ext-ID of the UE in the local information storage, and sends a registration response to the AE according to the identifier of the AE.

In specific implementation, a one-to-one mapping relationship list between the identifier of the CSE in the UE and the M2M-Ext-ID of the UE may be established and stored in the information storage of the CSE in the server, as shown in Table 4.

TABLE 4

| CSE-ID | Device-ID |
|---|---|
| ASN-CSE#1 | M2M-Ext-ID#1 |
| MN-CSE#1 | M2M-Ext-ID#2 |
| ... | ... |
| ASN-CSE#N | M2M-Ext-ID#N |

8. The AE receives the registration response sent by the CSE, and the registration process ends.

With the application registration process provided by the abovementioned embodiment, the network side server can acquire the M2M-Ext-ID of the UE and implement the subscription process of the application, so that the processes such as device triggering of the UE by the server can be implemented.

In another embodiment, there is also provided software for carrying out the technical solutions described in the abovementioned embodiments and the exemplary embodiments.

In another embodiment, there is also provided a storage medium in which the abovementioned software is stored, including but not limited to optical disks, floppy disks, hard disks, rewritable memories, and the like.

Obviously, those skilled in the art should know that each module or step of the embodiment of the present disclosure can be implemented by a universal computing device, and the modules or steps can be concentrated on a single computing device or distributed on a network formed by a plurality of computing devices, and can be implemented by programmable codes executable for the computing devices, so that the modules or steps can be stored in a storage device for execution with the computing devices, and can execute the steps shown or described in an order different from this in some cases, or can form each integrated circuit module, or multiple modules or steps therein can form a single integrated circuit module for implementation. As a consequence, the present disclosure is not limited to any specific hardware and software combination.

The above is only the exemplary embodiment of the present disclosure and not intended to limit the present disclosure, and for the technician of the field, the present disclosure can have various modifications and variations. Any modifications, equivalent replacements, improvements and the like within the principle of the present disclosure shall fall within the scope of protection defined by the appended claims of the present disclosure.

INDUSTRIAL APPLICABILITY

According to the technical solution provided by the embodiments of the present disclosure, an IN-CSE sends a second registration request according to a first registration request from an AE of an M2M SP, the first registration request carrying a binding relationship between an identifier of a CSE in a UE and an M2M-Ext-ID of the UE, and the second registration request carrying a binding relationship between an identifier of an M2M SP and an M2M-Ext-ID of the UE. The registration of an M2M application is implemented, and the technical problem in the related art that the processes such as device triggering cannot be triggered due to the lack of an effective mechanism for acquiring an M2M-Ext-ID is solved.

What is claimed is:

1. An application registration method, comprising:
   receiving, by a Common Services Entity in an Infrastructure Node (IN-CSE), a first registration request from an Application Entity (AE) of a Machine-to-Machine/Man Service Provider (M2M SP), wherein the first registration request carries a binding relationship between an identifier of a CSE in a User Equipment (UE) and an M2M External Identifier (M2M-Ext-ID) of the UE;
   sending, by the IN-CSE, a second registration request to an underlying Network Services Entity (NSE); and
   receiving, by the IN-CSE, a first registration response from the NSE, wherein the first registration response is a response message corresponding to the second registration request.

2. The method as claimed in claim 1, wherein the second registration request carries a binding relationship between an identifier of the M2M SP and the M2M-Ext-ID of the UE.

3. The method as claimed in claim 2, wherein before the IN-CSE receives the first registration request from the AE, the method further comprises:
   pre-allocating, by the M2M SP, the M2M-Ext-ID for the subscribed UE, determining, by the M2M SP, the binding relationship between the identifier of the CSE in the UE and the M2M-Ext-ID of the UE, and storing in the AE of the M2M SP, by the M2M SP, the binding relationship between the identifier of the CSE in the UE and the M2M-Ext-ID of the UE.

4. The method as claimed in claim 1, wherein the NSE comprises a user subscription data storage network element and a Machine Type Communication-Inter-Working Function (MTC-IWF) entity;
   sending, by the IN-CSE, the second registration request to the NSE comprises: sending, by the IN-CSE, the second registration request to the user subscription data storage network element via the MTC-IWF entity; and
   receiving, by the IN-CSE, the first registration response from the NSE comprises: receiving, by the IN-CSE, the first registration response sent by the user subscription data storage network element via the MTC-IWF entity.

5. The method as claimed in claim 4, wherein in a process of sending, by the IN-CSE, the second registration request via the MTC-IWF entity to the user subscription data storage network element, the method further comprises:
   buffering, by the MTC-IWF entity, an association relationship between the IN-CSE and the AE.

6. The method as claimed in claim 5, wherein before the IN-CSE receives the first registration request from the AE, the method further comprises:
   pre-allocating, by the M2M SP, the M2M-Ext-ID for the subscribed UE, determining, by the M2M SP, the binding relationship between the identifier of the CSE in the UE and the M2M-Ext-ID of the UE, and storing in the AE of the M2M SP, by the M2M SP, the binding relationship between the identifier of the CSE in the UE and the M2M-Ext-ID of the UE.

7. The method as claimed in claim 4, wherein in a process of receiving, by the IN-CSE, the first registration response sent by the user subscription data storage network element via the MTC-IWF entity, the method further comprises:
   locally storing, by the user subscription data storage network element, a binding relationship between an identifier of an M2M SP subscribed by the UE and the M2M-Ext-ID of the UE.

8. The method as claimed in claim 4, wherein before the IN-CSE receives the first registration request from the AE, the method further comprises:
   pre-allocating, by the M2M SP, the M2M-Ext-ID for the subscribed UE, determining, by the M2M SP, the binding relationship between the identifier of the CSE in the UE and the M2M-Ext-ID of the UE, and storing in the AE of the M2M SP, by the M2M SP, the binding relationship between the identifier of the CSE in the UE and the M2M-Ext-ID of the UE.

9. The method as claimed in claim 1, wherein the CSE in the UE comprises at least one of a CSE in an Application Service Node (ASN) and a CSE in a middle node (MN).

10. The method as claimed in claim 1, wherein after the IN-CSE receives the first registration response from the NSE, the method further comprises:
sending, by the IN-CSE, a second registration response to the AE, wherein the second registration is used for notifying the AE that registration has been completed.

11. The method as claimed in claim 1, wherein after the IN-CSE receives the first registration response from the NSE, the method further comprises:
locally storing, by the IN-CSE, the binding relationship between the identifier of the CSE in the UE and the M2M-Ext-ID of the UE.

12. The method as claimed in claim 1, wherein before the IN-CSE receives the first registration request from the AE, the method further comprises:
pre-allocating, by the M2M SP, the M2M-Ext-ID for the subscribed UE, determining, by the M2M SP, the binding relationship between the identifier of the CSE in the UE and the M2M-Ext-ID of the UE, and storing in the AE of the M2M SP, by the M2M SP, the binding relationship between the identifier of the CSE in the UE and the M2M-Ext-ID of the UE.

13. An application registration method, comprising:
receiving, by an underlying Network Services Entity (NSE), a second registration request from a Common Services Entity in an Infrastructure Node (IN-CSE), wherein the second registration request is a registration request sent after the IN-CSE receives a first registration request sent by an Application Entity (AE) of a Machine-to-Machine/Man Service Provider (M2M SP), and the first registration request carries a binding relationship between an identifier of a CSE in a User Equipment (UE) and an M2M External Identifier (M2M-Ext-ID) of the UE; and
sending, by the NSE, a first registration response to the IN-CSE, wherein the first registration response is a response message corresponding to the second registration request.

14. The method as claimed in claim 13, wherein the second registration request carries a binding relationship between an identifier of the M2M SP and the M2M-Ext-ID of the UE.

15. The method as claimed in claim 13, wherein after the NSE sends the first registration response to the IN-CSE, the method further comprises:
sending, by the IN-CSE, a second registration response to the AE, wherein the second registration is used for notifying the AE that registration has been completed.

16. The method as claimed in claim 13, wherein the NSE comprises a user subscription data storage network element and a Machine Type Communication-Inter-Working Function (MTC-IWF) entity;
receiving, by the NSE, the second registration request from the IN-CSE comprises: receiving, by the user subscription data storage network element, the second registration request via the MTC-IWF entity; and
sending, by the NSE, the first registration response to the IN-CSE comprises: sending, by the user subscription data storage network element, the first registration response to the IN-CSE via the MTC-IWF entity.

17. The method as claimed in claim 16, wherein in a process of receiving, by the user subscription data storage network element, the second registration request via the MTC-IWF entity, the method further comprises:
buffering, by the MTC-IWF entity, an association relationship between the IN-CSE and the AE.

18. The method as claimed in claim 16, wherein in a process of sending, by the user subscription data storage network element, the first registration response to the IN-CSE via the MTC-IWF entity, the method further comprises:
locally storing, by the user subscription data storage network element, a binding relationship between an identifier of an M2M SP subscribed by the UE and the M2M-Ext-ID of the UE.

19. An application registration apparatus, applied to a Common Services Entity in an Infrastructure Node (IN-CSE), wherein the application registration apparatus comprises a hardware processor arranged to execute the following program modules:
a first receiving module arranged to receive a first registration request from an Application Entity (AE) of a Machine-to-Machine/Man Service Provider (M2M SP), wherein the first registration request carries a binding relationship between an identifier of a CSE in a User Equipment (UE) and an M2M External Identifier (M2M-Ext-ID) of the UE;
a sending module arranged to send a second registration request to an underlying Network Services Entity (NSE); and
a second receiving module arranged to receive a first registration response from the NSE, wherein the first registration response is a response message corresponding to the second registration request.

20. An application registration apparatus, applied to an underlying Network Services Entity (NSE), wherein the application registration apparatus comprises a hardware processor arranged to execute the following program modules:
a receiving module arranged to receive a second registration request from a Common Services Entity in an Infrastructure Node (IN-CSE), wherein the second registration request is a registration request sent after the IN-CSE receives a first registration request sent by an Application Entity (AE) of a Machine-to-Machine/Man Service Provider (M2M SP), and the first registration request carries a binding relationship between an identifier of a CSE in a User Equipment (UE) and an M2M External Identifier (M2M-Ext-ID) of the UE; and
a sending module arranged to send a first registration response to the IN-CSE, wherein the first registration response is a response message corresponding to the second registration request.

* * * * *